Patented May 31, 1927.

1,630,485

UNITED STATES PATENT OFFICE.

GUSTAV F. GERDTS, OF BREMEN, GERMANY.

DETERMINING CRITICAL TEMPERATURE.

No Drawing. Application filed December 12, 1924, Serial No. 755,584, and in Germany August 26, 1924.

The invention relates to methods and means for indicating desired temperatures of heated objects or melting masses, the term—desired temperature—implying that degree of temperature at which alone it is possible or practicable to obtain a certain result in a most satisfactory manner, as for instance, the correct temperature for expanding tires, or for heating and hardening tools, for annealing purposes, or for pouring bearing or other metal, for working fused glass, etc.

The new improvements consist, primarily, in determining and indicating as well as recording the temperatures of heated objects by means of contacting testpieces comprising substances that melt and may also assume or impart a color at a certain temperature, in a manner that, on such a testpiece partly fusing when caused to touch or to slide over the surface of heated object, traces of the testpiece are thereby transferred to the object, adhering thereto and clearly visibly marking the same, for instance in plain or colored spots or stripes, thus conclusively showing at a glance when a certain temperature has been reached.

The new testpiece, losing at each test but little of its substance, may be used over and over, more or less in the manner of a pencil or crayon, and lends itself most readily to ascertaining the temperature of a larger body or object in a number of different places in quick succession.

To determine also, to what extent and in what places the critical temperature has been overstepped, if so, two or more additional testpieces, each adapted to indicate a different higher than the critical temperature, may be combined to be used simultaneously, so that for instance the several marks of different colors thus obtained clearly and accurately indicate in the shortest possible time the different temperatures of an object in all of its parts, if the heating has been uneven.

Temperatures have been measured heretofore with the aid of thermometers and pyrometers in a direct manner and indirectly through test pieces that fuse at certain, predetermined temperatures, but they can not be applied in covered places as advantageously as thermometers and pyrometers, whilst these, on the other hand, are not equally suited to all measurements of surface temperatures, as for instance on tubing.

By means of the test pieces now in use, the temperature of heated objects can be determined correctly in but one place, which applies equally however to thermometers and pyrometers, since these can not return to their initial indication speedily enough to enable a series of readings, in different places, to be made in quick succession.

In the absence of devices as afore described, the customary way of superficially judging, or indeed guessing temperatures, as by bringing a piece of wood or paper in contact with the heated object, or by observing the fusing mass and the scum or froth forming on the same, is usually resorted to, in most cases with highly unsatisfactory results, as is well understood.

My improved test pieces are made of any suitable substance, or substances, metallic or non-metallic, or consist of or contain metallic salts, as carbonate of copper, ochre, etc., or other coloring matter that have a fusing point equal to or approximating the desired temperature to be ascertained, which test pieces are brought into contact with the objects or masses to be tested, for instance by causing the test piece to touch or slide over the circumferential surface of a heated steel tire in quick succession, in as many different places as is found useful and in such a manner, that when the tire has actually reached the desired temperature for its expansion, this will at once become manifest through the easily discernible, partial fusing of the surface of the test piece as well as through the marking of the tire in consequence of the contacting with the partly fusing test piece, which marking may be colored for instance in red and extended as desired, to be considered a clearly visible, conclusive proof and a more or less permanent record of the fact, that the tire had been heated uniformly to the correct temperature preparatory to being shrunk on the wheel-body.

It is evident that, if the tire has not been heated to its desired temperature, there can not be any certifying or controlling mark on it, furthermore, if the heating is not uniform throughout, the molecular tension within the same, after contraction, will not be uniform throughout, as a consequence of which a fracture with all its possibilities of accidents may sooner or later occur. The tires having a circumference up to about 6 m. and a width up to about 15 cm., the known means of measuring temperatures are entirely inadequate to comply with the requirements that call for a quick, uninterrupted determination of the desired temperature along the entire circumference and surface.

If the tire has thus been contacted, simultaneously, also with two or more other testpieces adapted to fuse at a point somewhat in excess of the critical temperature but each to a different degree, it is obvious that the object may then become marked in other colors as well as in red, for instance in blue, green or yellow, thereby indicating at the same time in what places and to what extent the critical temperature had been overstepped and at the same time recording this fact on the object in as extended a manner as is desirable.

In the majority of heat processes it is more essential to ascertain the moment at which a certain, for an especial function, critical temperature has actually been reached, than to merely observe the rise of the temperature. It is moreover a matter of considerable consequence, to be able to thus ascertain the temperature at a number of more or less accessible places of an object in quick succession as well as to indelibly record the test on the object for future reference in case of accident.

To prove a fusing mass, as for instance metal in a crucible, or glass in its container, etc., a test piece, preferably of a length to reach the lowest part of the crucible or container, is thrust into the same, to determine the temperature at different distances from the surface through the partial fusing of the test piece at different points of the same.

To make thermic tests in covered or not easily accessible places, by surface contact, penetration, or otherwise, the test piece, for instance in the form of a bar or rod that is divided off into connected sections about 1 cm. in length, may be arranged to have one section fused away at each test. The test pieces may also contain resinous or other substances that produce smoke or vapors at certain temperatures, visibly indicative of desired degrees of heat as herein stated.

I do not wish to be confined to the particular form or construction of the test piece, which may be a bar, rod, disk, ball etcetera, nor to the precise substances constituting the test piece, since the range of temperatures at which the herein described testpieces may be used to great advantage can be made to extend up to 3000° C. and would therefore, of necessity, imply a correspondingly varied list of substances, too large to specify.

I claim and desire to secure by Letters Patent the following:

The herein described method of marking during a heat treatment objects of metal including iron and steel at predetermined temperatures, which consists in contacting the heated object with a hard test piece comprising inorganic substances adapted to partly fuse and leave a trace adhering to the object at the point of contact at the predetermined temperature, the trace thus left on the object hardening to a substantially indelible record at a temperature higher than 100° C.

In testimony whereof I have affixed my signature to this specification this 6th day of October, 1924.

GUSTAV F. GERDTS.